United States Patent [19]

Walker

[11] Patent Number: 4,615,780

[45] Date of Patent: Oct. 7, 1986

[54] METHOD OF REMOVING OXIDES OF SULFUR AND OXIDES OF NITROGEN FROM EXHAUST GASES

[75] Inventor: Richard J. Walker, Bethel Park, Pa.

[73] Assignee: The United States of America as represented by the United States Department of Energy, Washington, D.C.

[21] Appl. No.: 795,291

[22] Filed: Nov. 5, 1985

[51] Int. Cl.[4] ............................................. B01D 13/02
[52] U.S. Cl. .................................. 204/182.4; 204/301; 423/235; 423/242
[58] Field of Search .................................... 204/182.4

[56] References Cited

U.S. PATENT DOCUMENTS

| | | | |
|---|---|---|---|
| 3,394,068 | 7/1968 | Calmon | 204/182.4 |
| 3,523,880 | 8/1970 | Parsi | 204/182.4 |
| 3,524,801 | 8/1970 | Parsi | 204/182.4 |
| 3,704,218 | 11/1972 | Kato et al. | 204/180 P |
| 4,009,088 | 2/1977 | Hampel et al. | 204/182.4 |
| 4,044,101 | 8/1977 | Hisamatsu et al. | 423/235 |
| 4,082,835 | 4/1978 | Chlanda et al. | 423/242 |
| 4,107,015 | 8/1978 | Chlanda et al. | 204/182.4 |
| 4,204,930 | 5/1980 | Ono et al. | 204/180 P |
| 4,552,635 | 11/1985 | Jenczewski et al. | 204/182.4 |

OTHER PUBLICATIONS

J. D. Maxwell et al., "Preliminary Economic Analysis of NO$_x$ Flue Gas Treatment Processes Using TVA and EPRI Economic Premises", Dec. 1981, pp. 40-66.
L. G. Neal, "Evaluation of the NOXSO Combined NO$_x$/SO$_2$ Treatment Process", Jun. 12-13, 1984, pp. 248-265.
K. N. Mani et al., "Soxal TM Process", Jun. 1985, pp. 1-23.
Kang-Jen Liu et al, "Application of Bipolar Membrane Technology: A Novel Process for Control of Sulfur Dioxide from Flue Gases", Oct. 1977, pp. 58-70.
Richard J. Walker et al., "Evaluation of Advances Separation Techniques for Application to Flue Gas Cleanup Processes for the Simultaneous Removal of Sulfur Dioxide and Nitrogen Oxides", Jun. 1985.

*Primary Examiner*—Arthur P. Demers
*Attorney, Agent, or Firm*—Hugh W. Glenn; Robert J. Fisher; Judson R. Hightower

[57] ABSTRACT

A continuous method is presented for removing both oxides of sulfur and oxides of nitrogen from combustion or exhaust gases with the regeneration of the absorbent. Exhaust gas is cleaned of particulates and HCl by a water scrub prior to contact with a liquid absorbent that includes an aqueous solution of bisulfite and sulfite ions along with a metal chelate, such as, an iron or zinc aminopolycarboxylic acid. Following contact with the combustion gases the spent absorbent is subjected to electrodialysis to transfer bisulfite ions into a sulfuric acid solution while splitting water with hydroxide and hydrogen ion migration to equalize electrical charge. The electrodialysis stack includes alternate layers of anion selective and bipolar membranes. Oxides of nitrogen are removed from the liquid absorbent by air stripping at an elevated temperature and the regenerated liquid absorbent is returned to contact with exhaust gases for removal of sulfur oxides and nitrogen oxides.

18 Claims, 2 Drawing Figures

METHOD OF REMOVING OXIDES OF SULFUR AND OXIDES OF NITROGEN FROM EXHAUST GASES

CONTRACTUAL ORIGIN OF THE INVENTION

The U.S. Government has rights in this invention due to the employer/employee relationship of the inventor to the U.S. Department of Energy at the Pittsburgh Energy Research and Technology Center.

BACKGROUND OF THE INVENTION

The invention relates to a method for the simultaneous removal of $SO_2$ and $NO_x$ from exhaust or combustion gases.

Typically, flue gases resulting from the combustion of carbonaeous material in power plants contain hundreds to thousands of parts per million (PPM) of $SO_2$ and several hundred PPM of $NO_x$ mostly in the form of NO.

In a typical process, Sulfur Dioxide is removed from exhaust gas by wet-scrubbing. In one method, the flue gas is passed through an aqueous slurry of lime or limestone which reacts with the $SO_2$ to form insoluble $CaSO_4$ and $CaSO_3$. In a variation, known as the dual alkaline method, the flue gas is passed through a scrubber solution containing a sulfur dioxide absorbent such as sodium carbonate which reacts with the $SO_2$ to form $NAHSO_3$. The scrubber solution is regenerated by contact with a lime or limestone slurry where the $NAHSO_3$ reacts with the calcium to form large quantities of insoluble hydrated $CaSO_3$ and $CaSO_4$. These insoluble salts typically are sent to landfills for disposal and thereby add to the cost of the process. One other disadvantage is that this process is not effective in removing oxides of nitrogen, particularly NO, from exhaust gases.

In one effort to simultaneously remove oxides of sulfur and oxides of nitrogen ($SO_x$ and $NO_x$) from exhaust gases, the gas was contacted with an aqueous absorbent containing a metal sulfite, ferrous ions and an aminopolycarboxylic acid, usually ethylenediamine tetraacetic acid. The oxides of sulfur are removed as dithionates ($M_2S_2O_6$) in a crystallization separation. However, the dithionates are difficult and expensive to decompose.

In other processes (for instance U.S. Pat. No. 4,082,835) electrodialysis is employed to regenerate the spent liquid absorbent with the liberation of concentrated $SO_2$ gas. A second electrodialysis unit or some other process is required to convert the waste sulfate to a useful by-product or to a form for disposal. Such processes have not involved the removal of both oxides of nitrogen and oxides of sulfur. Furthermore, they have not permitted the regeneration of $SO_2$ absorption capacity and the conversion of waste sulfate in a single electrodialysis unit.

Therefore, in view of the above discussion of the disadvantages of prior processes, it is an object to the present invention to provide an improved process for the removal of both oxides of sulfur and oxides of nitrogen from exhaust gases.

It is a further object to provide a process for $NO_x$ and $SO_2$ removal in which the $SO_2$ is conveniently converted to sulfuric acid in the regeneration of the process absorbent.

It is also an object to provide an $SO_x$ and $NO_x$ removal process in which the disposal or decomposition of insoluble calcium sulfates or alkaline metal dithionates are avoided.

It is yet a further object to provide an improved electrodialysis process for the regeneration of an absorbent liquid for oxide of sulfur gas.

In accordance with the present invention, a method of removing oxides of sulfur and oxides of nitrogen from exhaust gases includes the steps of contacting the exhaust gas with a liquid absorbent including a metal chelate and a solution of sulfite and bisulfite species. The metal chelate is specific for oxides of nitrogen while the sulfite solution absorbs oxides of sulfur. After the liquid absorbent is spent, it is regenerated first by electrodialysis involving passing it through a first compartment defined between a bipolar membrane and an anion selective membrane. At the same time, a solution of sulfuric acid is passed through an adjacent compartment, defined between the anion selective membrane and a second bipolar membrane. By imposing a source of electrical potential across the adjacent compartments, water is split at the bipolar membrane to provide hydroxide ions into the liquid absorbent and hydrogen ions ($H_3O^+$) into the sulfuric acid solution. Bisulfite or sulfite anions are transferred from the liquid absorbent into the acid solution at the same time. This reduction in the bisulfite anion concentration regenerates the liquid absorbent capacity in respect to oxide of sulfur gases. The oxides of nitrogen are stripped from the liquid absorbent into a flow of oxygen containing gas to regenerate the capacity of the liquid absorbent for oxides for nitrogen. The regenerated absorbent liquid is recycled into contact with the exhaust gases in the continuous removal of oxide of nitrogen and oxide of sulfur pollutants.

In more specific aspects of the invention, the absorbent liquid includes an aqueous solution of sulfite and bisulfite ions in ratio of about 1 to 10 balanced by cations of sodium, potassium or ammonia.

In further aspects of the invention, the metal chelate is an aminopolycarboxylic acid with ferrous or zinc, preferably zinc, substituted therein. The aminopolycarboxylic nitrilotriacetic acid, diethylentriamine-N,N,N',N",N"'-pentaacetic acid, nitrilotripropionic acid, 1,2-propylenediamine-tetra-acetic acid, N-hydroxyethylethylene diamine-N,N',N' triacetic acid, ethylenediamine-tetrapropionic acid, or ethylenediamine tetraacetic acid (EDTA).

In other aspects of the invention, the electrodialysis regeneration of the liquid absorbent in respect to oxide of sulfur capacity is performed in an electrodialysis stack including only bipolar membranes and anion selective membranes. Hydroxide ions thus are added into the liquid absorbent and bisulfite ions are transferred from the liquid absorbent into the sulfuric acid solution.

In further aspects of the invention, sulfuric acid solution containing sulfurous acid is contacted with an oxygen containing gas to oxidize the sulfurous acid to sulfuric acid.

In other aspects, the oxygen containing gas consists essentially of air substantially free of carbon dioxide. The oxidation is performed in the presence of a catalyst such as $V_2O_5$, $Fe_2O_3$ or $CuO$.

In futher aspects of the invention, the liquid absorbent with regenerated capacity for sulfur oxides is contacted with a flow of air in excess of 70° C. while the liquid absorbent is at a pH in excess of five.

A BRIEF DESCRIPTION OF THE DRAWINGS

The invention is illustrated in the accompanying drawings, wherein.

DETAILED DESCRIPTION OF THE INVENTION

Figure 1:
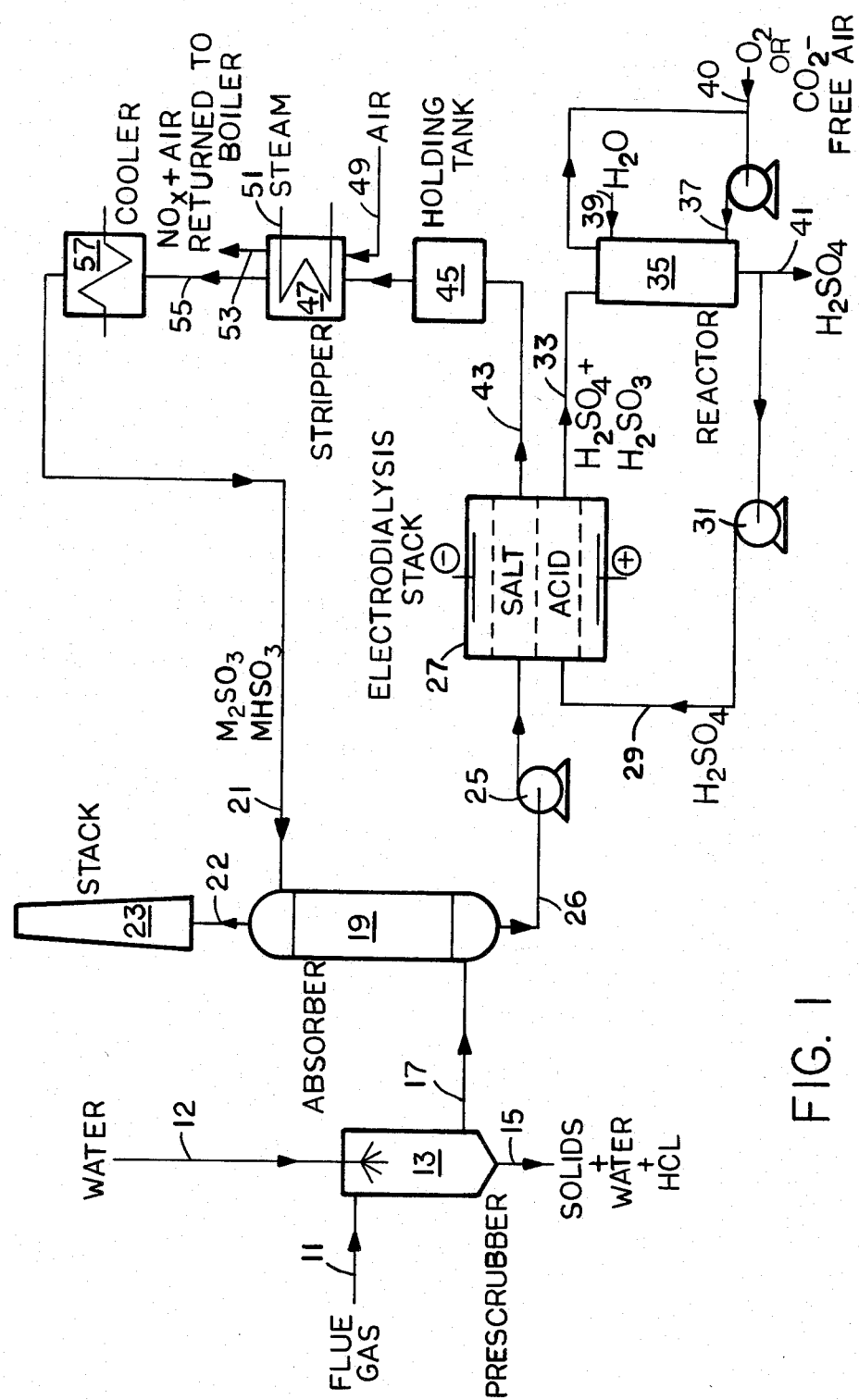
FIG. 1 is a schematic diagram of a process for removing oxides of sulfur and oxides of nitrogen gases from an exhaust gas with the continuous regeneration of the liquid absorbent.

The invention is described with reference to FIGS. 1 and 2 of the drawings. In FIG. 1, an exhaust or flue gas 11 is contacted with a water flow 12 in a prescrubber or a spraytower 13 to remove solids and HCl solution 15 prior to, transfer to an absorber 19 through conduit 17.

The aqueous absorbent 21 contacts the flue gas in absorber column 19 to take up the oxides of sulfur and oxides of nitrogen, particularly $SO_2$ and NO. The cleaned exhaust gas 22 is then discharged through a stack 23 and the spent liquid absorbent 26 is transferred through pump 25 to an electrodialysis stack 27 to begin its regeneration.

The liquid absorbent used in absorber 19 is an aqueous mixture of sulfite and bisulfite values with a metal chelate additive. Metal sulfite and bisulfite salts of the alkaline metals, such as sodium or potassium, as well as the sulfites and bisulfites of ammonia can be selected. The metal chelate additive is particularly for NO removal and involves an aminopolycarboxylic acid as the chelate and a transition metal, such as iron or zinc, for the metal. Where iron is selected it preferably is retained in the +2 oxidation state while zinc does not oxidize to an undesirable state in the present process. Accordingly, the zinc metal chelate is a preferred selection. The aminopolycarboxylic acids contemplated for use include nitrilotriacetic acid, diethylenetriamine-N,N, N',N'',N''-pentaacetic acid, nitrilotripropionic acid, 1, 2-propylene-diamine-tetraacetic acid, N-hydroxyethylethylene diamine-N,N',N' triacetic acid, ethylenediamine-tetrapropionic acid, and ethylenediamine tetraacetic acid (EDTA).

The electrodialysis stack also requires a flow of aqueous sulfuric acid 29 circulated by pump 31 to receive bisulfite ion transferred from the absorbent liquid. The acid solution 33 discharged from the electrodialysis stack includes $H_2SO_4$ and $H_2SO_3$ in aqueous solution. The solution is passed to reactor 35 where water is added at 39 to make up for that lost in the electrodialysis unit 27 and the by-product sulfuric acid stream 41. The acid solution is contacted with an oxygen containing gas 37 that is substantially free of carbon dioxide to oxidize the sulfurous acid to sulfuric acid without forming acid carbonate species ($HCO_3^-$ or $H_2CO_3$). Gas 37 can be oxygen gas, oxygen with an inert diluent gas or air from which carbon dioxide has been substantially removed. Additional oxygen-containing gas can be added at 40 as needed and a by-product sulfuric acid stream 41 can be withdrawn from the acid loop.

The liquid absorbent leaving the electrodialysis stack at 43 has a reduced concentration of bisulfite over that of the spent absorbent. Consequently, the capacity for oxide of sulfur absorption is regenerated. This partially regenerated absorbent is passed to a reservoir or holding tank 45 to provide holding time for chemical reduction of any ferric ion that may have been generated in the highly oxidizing conditions of the absorber 19. The sulfite in the absorbent will reduce the ferric to ferrous species. As will be discussed below, liquid absorbents, that do not employ ferrous substituents in the metal chelate may not require this chemical reduction step.

The metal chelate is regenerated in respect to oxide of nitrogen capacity in stripper 47. In stripper 47, the liquid absorbent is heated to transfer its oxide of nitrogen contaminants into air flow 49 which is returned at 53 to the boiler or other combustion facility.

The temperature of the regenerated liquid absorbent 55 is reduced in cooler 57 for return at 21 into the absorbent column 19 in contact with the exhaust gases 17. Preferably, the absorbent is cooled to about 30°–50° C. This provides a continuous process for the removal of sulfur oxide and nitrogen oxide pollutants.

In the absorber column 19, the following reactions are believed to occur where sodium sulfites are selected.

$$Na_2SO_3 + SO_2 + H_2O \rightarrow 2NaHSO_3$$

$$AY + NO \rightarrow AY.NO$$

Where A is a transition metal or zinc and Y is an aminopolycarboxylic acid. It is preferred that the absorbent liquid be at a pH of 4 to 8, preferably at 5 to 7. If the pH is too high hydroxide ions will reduce the effectiveness of the electrodialysis stack, and metal hydroxides may precipitate to foul the electrodialysis membranes. If the pH is less than 4, the $SO_x$ and $NO_x$ removal efficiencies are reduced.

Figure 2:
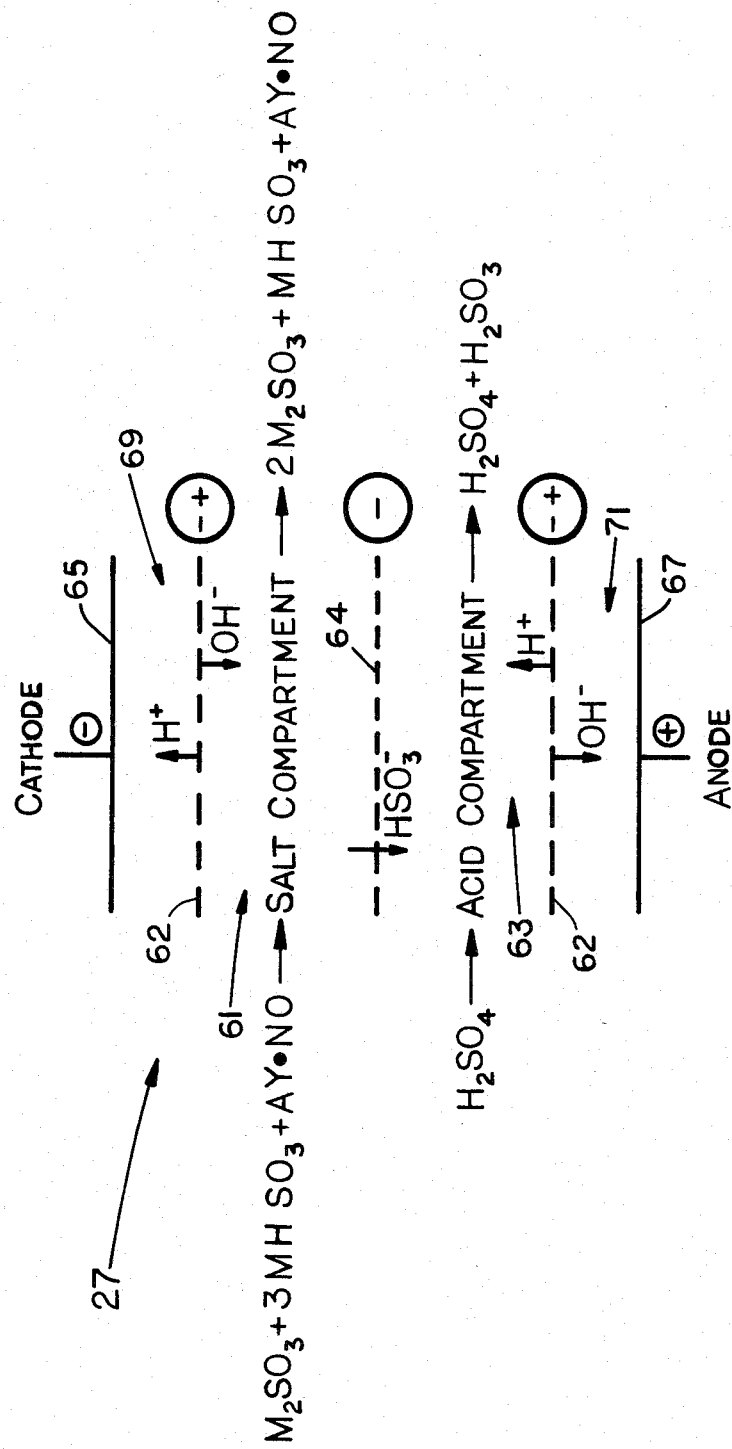
FIG. 2 is a schematic diagram of an electrodialysis stack for the regeneration of a liquid absorbent.

A simplified representation of the electrodialysis stack 27 is illustrated in FIG. 2. Only a single electrodialysis cell is shown. In a practice, 50 to 300 cells, can be stacked between a pair of electrodes. The single cell illustrated in FIG. 2, includes a salt compartment 61 for passing the liquid absorbent and an acid compartment 63 through which the aqueous solution of sulfuric acid flows. This cell, as are all the cells in the stack, are disposed between a cathode 65 and an anode 67. At the respective ends of the stack are a cathode compartment 69 and an anode compartment 71. The anode and cathode compartment can contain dilute solutions of sulfate ions. During operations, small amounts of hydrogen gas are formed at the cathode and small amounts of oxygen gas are formed at the anode. However, this loss in effeciency is of little significance in a large stack and such gases may be returned to the boiler for combustion.

The salt compartment 61 and the acid compartment 63 are each bounded by a bipolar membrane 62 on one side and an anion selective membrane 64 at the opposite side of the compartment. The bipolar membrane only permits the splitting of water into hydrogen ions and hydroxide ions with hydroxide ions migrating to the salt compartment and hydrogen ions migrating to the acid compartment. The anion selective membrane only permits passage of anions towards the anode.

An example of the principal reaction in the electrodialysis stack is as follows:

$$2NaHSO_3 + OH^- \rightarrow HSO_3^- + Na_2SO_3 + H_2O$$

In the acid compartment, the following equilibrium occurs:

$$H_3O^+ + HSO_3^- \rightleftharpoons H_2SO_3 + H_2O$$

These reactions are made possible by the electrolytic splitting of water to form hydronium (hydrated hydrogen ion) and hydroxide ions as well as the transfer of the bisulfite or sulfite ion from the salt compartment across the anion selective membrane into the acid compartment.

Side reactions in the absorber form $Na_2SO_4$ and $Na_2S_2O_6$ and the following side reactions may occur:

$$Na_2SO_4 + 2OH^- \rightarrow SO_4^= + 2NaOH$$

$$Na_2S_2O_6 + 2OH^- \rightarrow S_2O_6^= + 2NaOH$$

The anions formed on reaction or dissolution of these salts permeate through the anion selective membrane.

In the acid compartment of the electrodialysis stack, the dithionate ions ($S_2O_6^=$) undergo the decomposition:

$$S_2O_6^= + H_2O \rightarrow SO_4^= + H_2SO_3$$

Hence, the acid solution contains only sulfuric acid and sulfurous acid entering reactor 35 for oxidation.

In reactor 35, the following reaction occurs:

$$H_2SO_3 + 1/2O_2 \rightarrow H_2SO_4$$

To enhance this reaction, a catalyst such as vanadium pentoxide, ferric oxide, or cupric oxide can be employed. The concentrated sulfuric acid can be withdrawn for other use.

The metal chelate with absorbed NO is unaffected in the electrodialysis stack.

Where iron is the selected metal chelate species, side reactions in the absorber can oxidize ferrous species to the ferric state. This can be reversed by sulfite reduction in the holding tank 45, however, since the reduction of ferrous to ferric ions is slow, zinc is a preferred selection for the metal chelate in the liquid absorbent.

The liquid absorbent is further regenerated in stripper 47 by the removal of $NO_x$ with air. Preferrably the pH in stripper 47 is maintained at 5 or above to prevent any appreciable stripping of $SO_2$ gases. A mixture of air and $NO_x$ gases can be returned to the boiler or other combustion facility. It has been found that the exhaust gases from the combustion facility will arrive at an equilibrium $NO_x$ concentration even though these gases are recycled in the process. This equilibrium will typically be 20 to 50% in excess of that in the original exhaust gas. Consequently, oxides of nitrogen entering the system in flue gas at 11, will be discharged from the stack as elemental nitrogen and oxygen.

It is therefore seen that the present invention provides a method for simultaneously removing oxides of sulfur and oxides of nitrogen pollutants from an exhaust gas stream. The only raw materials needed for the regeneration of the liquid absorbent are water, and oxygen or carbon dioxide free air. The process provides a valuable by-product of sulfuric acid with waste streams including only a slurry of fly ash in dilute HCl solution and the clean stack gas. The process is adapted for continuous operation with both the sulfur oxides and nitrogen oxides removed in a single contacting operation. The difficult-to-absorb NO is readily removed in this process and the oxides of nitrogen continuously recycled to the combustion facilities for disposal.

Although the present invention is described in terms of specific materials, embodiments and process steps, it will be clear to one skilled in the art that various modifications can be made within the scope of the invention as defined in the accompanying claims.

The embodiments of this invention in which an exclusive property or privilege is claimed are defined as follows:

1. A method of removing oxides of sulfur and oxides of nitrogen from an exhaust gas, said method comprising contacting the exhaust gas with a liquid absorbent including a metal chelate for oxide of nitrogen absorption and a solution of sulfite and bisulfite ions for oxide of sulfur absorption;

regenerating the liquid absorbent capacity for oxide of sulfur gases by electrodialysis in a cell containing at least two bipolar membranes, an anion selective membrane and a plurality of compartments bounded by said membranes wherein the regeneration of absorbent liquid comprises the steps of passing the absorbent liquid through a compartment bounded by a first bipolar membrane and the anion exchange membrane, passing a solution of sulfuric acid through an adjacent compartment bounded by the anion exchange membrane and a second bipolar membrane, imposing a source of electrical potential across the cell sufficient to split water molecules across the bipolar membranes and thereby provide hydroxide ions into the liquid absorbent and hydrogen ions into the sulfuric acid solution while driving bisulfite ions from the liquid absorbent into the sulfuric acid solution to reduce the bisulfite concentration in the liquid absorbent;

stripping oxides of nitrogen from the liquid absorbent into a gas flow to regenerate the capacity of the liquid absorbent for oxide of nitrogen gases; and recycling the regenerated liquid absorbent into contact with the exhaust gas.

2. The method of claim 1 wherein the exhaust gas is scrubbed with water to remove particulates and HCl prior to contact with the liquid absorbent.

3. The method of claim 1 wherein the liquid absorbent includes an aqueous solution of $M_2SO_3$ and $MHSO_3$ where M is selected from the group of cations consisting of $Na^+$, $K^+$ and $NH_4^+$.

4. The method of claim 3 wherein the ratio of $HSO_3^-$ to $SO_3^=$ in the regenerated liquid absorbent is about 10/1.

5. The method of claim 3 wherein the liquid absorbent includes a metal chelate selected from the group consisting of $Fe^{+2}$ substituted onto an aminopolycarboxlyic acid and $Zn^{+2}$ substituted onto an aminopolycarboxlyic acid.

6. The method of claim 5 wherein the liquid absorbent includes a metal chelate consisting essentially of an aminopolycarboxlyic acid with $Zn^{+2}$ metal substitutions.

7. The method of claim 5 wherein the aminopolycarboxlyic acid is selected from the group consisting of nitrilotriacetic acid (NTA), diethylenetriamine-N,N,N',N'',N''-pentaacetic acid, nitrilotripropionic acid, 1,2-propylene-diamine-tetra-acetic acid, N-hydroxyethylethylene diamine- N,N',N' triacetic acid, ethylenediamine-tetrapropionic acid, and ethylene-diamine tetraacetic acid (EDTA).

8. The method of claim 1 wherein the regeneration of the liquid absorbent consists essentially of the electrodialysis steps of adding hydroxide ions into the liquid absorbent through a bipolar membrane and withdrawing bisulfite or sulfite ions from the liquid absorbent through an anion permeable membrane.

9. The method of claim 1 wherein the bisulfite driven into the sulfuric acid solution is acidified to sulfurous acid and contacted with a second oxygen containing gas to oxidize sulfurous acid to sulfuric acid.

10. The method of claim 9 wherein the second oxygen containing gas contacts the sulfurous acid in the presence of a catalyst selected from the group consisting of $V_2O_5$, $Fe_2O_3$ and $CuO$.

11. The method of claim 9 wherein the second oxygen containing gas consists essentially of air substantially free of carbon dioxide.

12. The method of claim 1 wherein the liquid absorbent with regenerated capacity for oxide of sulfur gases following electrodialysis, includes ferric ions and is held in contact with sulfite ions for a sufficient time to reduce ferric to ferrous ions.

13. The method of claim 1 wherein the metal chelate consists essentially of a zinc aminopolycarboxylic acid and the zinc remains in the plus two oxidation state.

14. The method of claim 1 wherein the liquid absorbent, regenerated by electrodialysis, is contacted with air at a temperature in excess of 70° C. and at a pH in an excess of 5 to strip oxides of nitrogen from the liquid absorbent into the air.

15. The method of claim 1 wherein the liquid absorbent is at a temperature of 30°–50° C. in contact with the exhaust gas.

16. A method of treating exhaust gas to remove oxides of sulfur and oxides of nitrogen, said method comprising:

contacting the exhaust gas with a liquid absorbent including a metal chelate and a solution of sulfite and bisulfite ions;

subjecting the spent liquid absorbent to electrodialysis in conjunction with a membrane separated flow of sulfuric acid solution within an electrical field urging cation and anion migration to opposite electrical poles, said electrical field effecting migration of bisulfite or sulfite ions from the liquid absorbent into the sulfuric acid solution, splitting water molecules into hydroxide and hydrogen ions with the passage of hydrogen ions into the sulfuric acid solution to react with bisulfite ions and the passage of hydroxide ions into the liquid absorbent to electrically balance and increase the pH thereof;

stripping the oxides of nitrogen from the liquid absorbent with a flow of air; and recycling the regenerated liquid absorbent into contact with the exhaust gas.

17. The method of claim 16 wherein the liquid absorbent is separated from the sulfuric acid solution in an electrodialysis stack by an anion-permeable membrane at a first interface and by a bipolar membrane at a second interface.

18. An electrodialysis method for regenerating a spent liquid absorbent in respect to oxide of sulfur capacity comprising passing the liquid absorbent in electrodialysis relation to a flow of sulfuric acid wherein the flow of liquid absorbent and flow of sulfuric acid are separated in an electrodialysis stack at a first interface by an anion-permeable membrane and at a second interface by a bipolar membrane to transfer bisulfite ion from the liquid absorbent into the sulfuric acid solution and to electrolyze water molecules with the migration of hydrogen and hydroxyl ions to equalize charge in the respective flows.

* * * * *